Figure 1:
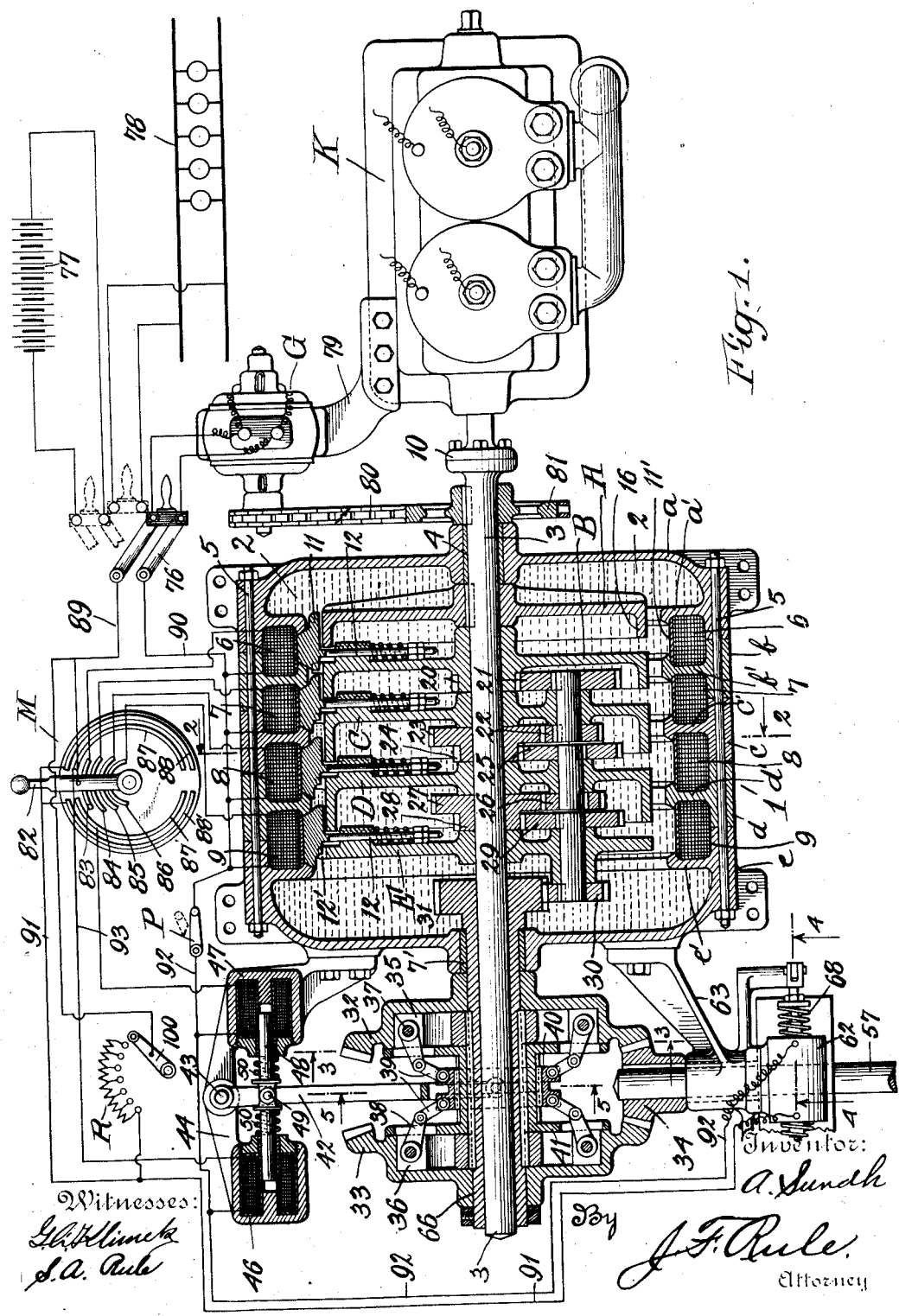

A. SUNDH.
MAGNETICALLY CONTROLLED POWER TRANSMISSION MECHANISM.
APPLICATION FILED AUG. 5, 1909.

983,949.

Patented Feb. 14, 1911.
2 SHEETS—SHEET 1.

Witnesses:
Inventor:
A. Sundh
By J. F. Rule.
Attorney

A. SUNDH.
MAGNETICALLY CONTROLLED POWER TRANSMISSION MECHANISM.
APPLICATION FILED AUG. 5, 1909.
983,949.
Patented Feb. 14, 1911.
2 SHEETS—SHEET 2.
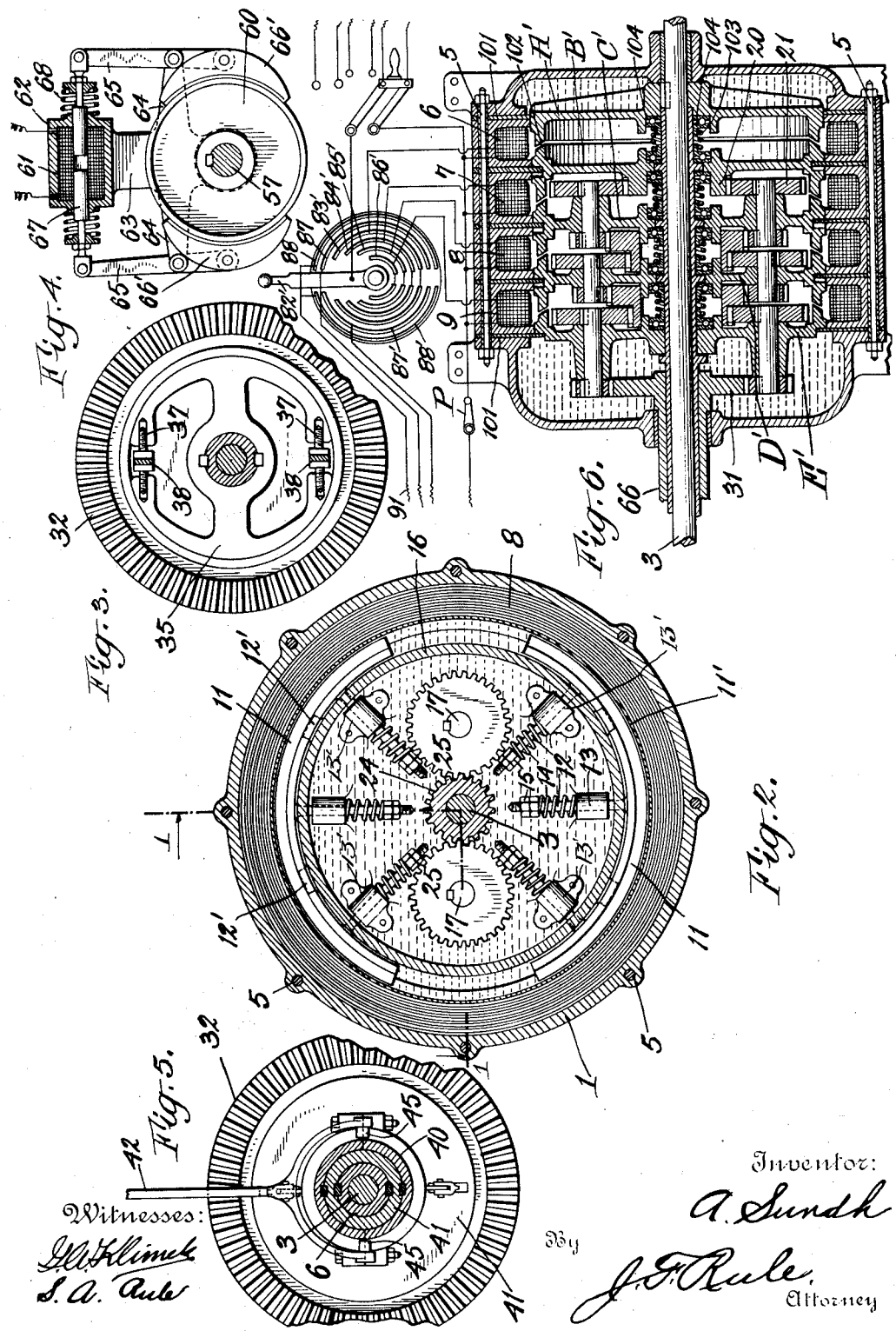

UNITED STATES PATENT OFFICE.

AUGUST SUNDH, OF YONKERS, NEW YORK.

MAGNETICALLY-CONTROLLED POWER-TRANSMISSION MECHANISM.

983,949.  Specification of Letters Patent.  Patented Feb. 14, 1911.

Application filed August 5, 1909. Serial No. 511,382.

*To all whom it may concern:*

Be it known that I, AUGUST SUNDH, a citizen of the United States, residing at Yonkers, in the county of Westchester and State of New York, have invented a new and useful Improvement in Magnetically-Controlled Power-Transmission Mechanism, of which the following is a specification.

My invention relates to power transmission mechanism in which speed changing devices are interposed between a driving element and a driven element.

The invention comprises a plurality of members mounted for rotation about a common axis, and connected by trains of gearing which effect different speeds in the rotation of the different members, means being provided for directly connecting any desired number of said members for rotation together at the same speed. By connecting a greater or less number of these members directly together, the speed and power transmitted from the driving element to the driven mechanism may be varied as desired.

The invention further comprises reversing mechanism and brake mechanism combined with the speed changing devices, and novel means for controlling all of the mechanism from a distance, all of which is more fully set forth hereinafter.

It is well known by those familiar with the art that the various forms of speed changing gear mechanism now in common use are defective and troublesome on account of the fact that the gear connections have to be changed as the speed is changed, which necessitates careful handling, and often results in stripping the gear teeth or in other damage to the mechanism. Further, when such mechanism is operated under a heavy load, the gears bind and it frequently is necessary to slow down or stop the driving mechanism entirely before the speed gears can be changed. Where electric clutches are used it has been customary to deënergize one clutch before energizing the following one but this arrangement has been the cause of much trouble, partly on account of the difficulty in properly regulating the time at which the respective clutches are energized and deënergized and where the timing is inaccurate the gears are often stripped.

An object of the present invention is to overcome these objections by providing a construction comprising a train of permanently connected transmitting gears, the speed transmitted to the driven mechanism being varied by varying the number of said gears having a relative movement.

According to applicant's invention, the clutch magnets which regulate the speed transmitted to the driven member can be energized one after the other without breaking the circuits of magnets already energized. In this way the speed can be increased without bringing any sudden strain on the driving member and without any sudden shocks or strain on the mechanism.

A further object of the invention is to provide an improved arrangement in which the speed changing gearing and the reversing mechanism are controlled by a single lever or controlling device. This arrangement is of especial value for use on automobiles and other devices where quick and accurate operation of the controlling mechanism is often of vital importance. With the devices now in general use in which the reversing mechanism is controlled by an independent lever, and the speed changing gears have to be disconnected before the reversing mechanism is operated, considerable time is consumed, and the complication of levers may result in confusion and serious mistakes in operation where quick action is necessary. In the present invention, the employment of a single lever to control the operation of the speed changing and reversing mechanism permits quick action and avoids the danger of mistakes and confusion.

The invention further comprises the combination of brake apparatus with the speed changing and reversing mechanism and controlled by the same lever.

The invention is particularly adapted for use with self-propelled vehicles such as automobiles, railroad trains and the like, and may also be used with lathes, planers, boring mills, and various other mechanisms.

Other objects of the invention will appear hereinafter.

The novel combinations of elements are set forth in the appended claims which also define the scope of the invention.

In the accompanying drawings, which illustrate a construction embodying my invention, Figure 1 is a general view showing the speed changing gearing and the reversing mechanism in section, the section for the gearing being indicated by the line 1—1 of Fig. 2, and also showing diagrammatically the prime mover, electric generator and controlling circuits; Fig. 2 is a sectional elevation view taken substantially on the plane indicated by the line 2—2 of Fig. 1; Figs. 3 and 5 are sectional views of the reversing clutch mechanism as indicated by the lines 3—3 and 5—5 respectively of Fig. 1; Fig. 4 is a sectional view of the brake as indicated by the line 4—4 of Fig. 1; Fig. 6 shows a modification.

The speed changing gears, as herein shown, are inclosed within a casing 1 adapted to contain a light oil 2 in which the gearing is immersed or partially immersed. The oil serves to keep the mechanism lubricated without attention, causes a smoother and better action of the clutches, and helps to dissipate the heat. A thin oil, as for example, the thinnest lard oil usually secures the best action of the clutches. In some cases, depending on the particular construction and the uses to which the invention is to be put, the oil may preferably be omitted. The casing 1 is made up of sections $a$, $b$, $c$, $d$ and $e$ of cast iron or other magnetic material secured together by bolts 5. These sections are formed with inwardly extending flanges $a'$, $b'$, $c'$, $d'$ and $e'$ between which are located the magnet coils 6, 7, 8 and 9 of the electro-magnetic clutches. Guard rings 11' of brass or other suitable material cover the inner faces of the magnet coils.

A drive shaft 3 extends through the casing and is journaled near one end in a bushing 4. On the free end of the drive shaft is loosely mounted a sleeve or hollow shaft 66 journaled in a bushing 7'. The drive shaft is connected to a prime mover or any suitable source of power, in this instance shown as an internal combustion engine K, connected by a coupling 10 to the drive shaft.

Within the casing 1 is a series of rotary members or disks A, B, C, D and E. The disk A is keyed to the drive shaft and the other disks are loosely mounted thereon. Each of the disks, except the disk A, carries one or more magnetic clutch members 11, and each of these clutch members is provided with a plurality of rods or stems 12 which extend loosely through lugs such as 13 and 13'. The outer lugs 13' are preferably made in separate pieces from the disk to permit the parts to be readily assembled. The middle lugs 13, however, may be cast integral with the disks if desired. The openings in the lugs 13' are large enough to admit of a slight lateral movement of the outer stems 12 as the clutch members are operated. Compression springs 14 are mounted on the rods 12 between the lugs 13 and adjustable nuts 15 on the rods. When the magnet coils are deënergized, the springs hold the clutch members in frictional contact with flanges 16 formed on the rotary disks thereby forming yieldable or frictional connections between the disks. When the magnet coils are excited, the clutch members 11 are withdrawn from the rotary disks and held against the flanges $a'$, $b'$, etc. Lugs 12' formed on the disks engage recesses in the brake shoes 11 and take up the lateral thrust, thereby preventing any strain on the stems 12.

The disks C, D and E each has journaled therein stud shafts 17 on opposite sides of the drive shaft 3, and each stud shaft has a pair of spur gears keyed thereto. The gears carried by the disk C are designated 21 and 22, those carried by the disk D are designated 25 and 26, and those carried by the disk E, 29 and 30. A gear 20, formed on the hub of the disk B, meshes with the gear 21. Between the disks C and D is a gear member loosely mounted on the drive shaft and comprising integral gears 23 and 24 which mesh with the gears 22 and 25, respectively. A similar gear member is located between the disks D and E and comprises gears 27 and 28 in mesh with the gears 26 and 29. A gear 31 formed on the end of the hollow shaft 6 meshes with the gear 30.

The reversing clutch mechanism as shown in Figs. 1, 3 and 5, comprises oppositely disposed outer clutch members 32 and 33 formed with miter gear teeth meshing with a pinion 34 keyed to a driven shaft 57, the latter being connected to the driven mechanism. Inner clutch members 35 and 36 are keyed to the sleeve 6 and are adapted to grip the outer members 32 and 33 respectively. The inner clutch members are expanded by means of rods 37 having right and left hand screws engaging correspondingly threaded recesses in the ends of the clutch shoes. The screw rods are provided with crank arms 38, connected through links 39 to a collar 40 splined on a flanged sleeve or spool 41 which in turn is keyed to the hollow shaft 6. A lever 42 is pivoted at 43 to a bracket 44 and its free end is bifurcated to straddle the collar 40, and provided with lugs 45 engaging an annular recess in the collar.

Electro-magnets 46 and 47 are carried by the bracket 44 and are provided with cores 48 pivotally connected at 49 to the lever 42. Compression springs 50 hold the lever in a central position when the magnets are deënergized. With the parts in this position, the clutch members are disconnected and the rotation of the shaft 66 is not imparted to the outer clutch members. If the electromagnet 46 is excited, it will draw its core inwardly, carrying the lever 42 and collar 40 to the left, and operating in a well known way to expand the clutch member 36 into frictional contact with the outer clutch member 33, so that rotation of the shaft 66 will be imparted to the driven shaft 57. If the magnet 47 is energized, it will operate in like manner to connect the clutch members 32 and 35 and effect a rotation of the driven shaft in the reverse direction.

An electro-magnetic brake which may be of any approved construction is preferably associated with the driven shaft. As herein shown, the brake mechanism comprises a brake sheave 60 keyed to the driven shaft 57. The magnet winding is in the form of a solenoid 61 which is surrounded by a sheath 62 of magnetic material mounted on a bracket 63 bolted to the casing 1. The bracket 63 is provided with arm 64 to which are pivoted the brake levers 65. Brake shoes 66' are pivotally connected to the lower ends of the brake levers, and magnet cores 67 have a pivotal connection with the upper ends of the brake levers. Brake springs 68 serve to apply the brake shoes to the sheave 60 when the magnet is deënergized. When the magnet is excited, the cores 67 are drawn inwardly, compressing the brake springs and retracting the brake shoes.

Electric current for the various magnet coils may be supplied from any convenient source of supply, the latter depending largely on local conditions and the use to which the invention is to be put. As shown, a switch 76 is adapted to connect the circuits for the magnet coils either with a storage battery 77, a lamp circuit 78, or an electric generator G. The latter is well adapted for use in combination with the internal combustion engine K when the gearing is used on automobiles, cars, or the like. As shown, the generator G is mounted on a bracket 79 bolted to the engine frame, and is driven by means of a sprocket chain 80 running over a sprocket wheel 81 keyed to the drive shaft 3.

The circuits for all the magnet windings are controlled by means of a single manual controller M which comprises a hand lever 82 in electrical connection with stationary contact strips 83, 84, 85 and 86 when the lever is in its central position. When the lever is moved to the right from a central position, it engages contacts 87 and 88, and when moved to the left, it engages similar contacts 87' and 88'.

The operation of the invention will be understood from the following description: The engine K is normally run continuously at a practically constant speed and drives the generator G at a corresponding speed. When the controller lever 82 is in central position, as shown, the clutch magnet coils 6, 7, 8 and 9 receive current from the generator G. The circuits for these coils may be traced through the conductor 89 to the switch lever 82, and from thence through the contacts 83, 84, 85 and 86, and to the magnet coils 6, 7, 8 and 9, respectively, and through the common return wire 90 to the switch 76, and to the generator. The clutch shoes 11 will therefore be drawn outward against the stationary clutch faces, and hold the disks B, C, D and E against rotation. The circuits for the reversing clutch magnets 46 and 47 and the brake magnet 61, are open at this time, so that the driven shaft 57 remains stationary with the brake applied, the drive shaft 3 and disk A rotating idly in the casing. If now, the controller lever be moved to the right, for example, it will engage the contacts 87 and 88, thereby closing circuits to the coils of the reversing clutch magnet 46 and the brake magnet. The circuit for the brake magnet is through the conductor 89, switch lever 82, contact 88, conductor 91, brake magnet coil, and through the return conductors 92 and 90. The brake magnet is therefore energized and the brake shoes lifted. The circuit for the magnet 46 is by way of conductor 89, switch lever 82, contact strip 87 and conductor 93 to the magnet coil, and from the magnet coil through the return conductors 92 and 90. The magnet 46 being excited, operates as before explained to connect the clutch members 33 and 36. By the continued movement of the switch lever 82 to the right, it is disengaged from the contacts 83, 84, 85 and 86 in succession, thereby opening the circuits for the clutch magnet coils 6, 7, 8 and 9. While the coil 6 is deënergized, its armatures 11 are dropped and clutched to the disk A, thereby connecting the disk B for rotation with the disk A. The disk B now rotates with the drive shaft 3, and the motion is transmitted through the train of gears 20 to 31, thereby rotating the hollow shaft 6. The latter transmits its motion through the left hand reversing clutch to the driven shaft 57. Each of the gears 20 to 31 rotates about its own axis, the gear 20 forming a driving element, and owing to the relative sizes of the gears, the speed of the shaft 66 is comparatively slow. If, for example, the diameters of the gears 20, 22, 24, 26, 28 and 30, are respectively one-half the diameters of the gears 21, 23, 25, 27, 29 and 31, the angular velocity of the shaft 6 will be one sixty-fourth that of the drive shaft 3. The movement of the driven member is therefore comparatively slow.

When the circuit for the coil 7 is opened, the armatures 11 carried by the disk C are released from the casing and engage the disk B, thereby forming a yieldable or frictional connection between the disks B and C so that disk C is caused to rotate with the disks B and A, and the drive shaft 3, as a unit. It will be seen that the gears 21 and 22 are now locked against rotation about their own axis, and that therefore the member comprising the gears 23 and 24 is held against rotation relatively to the disk C. In other words, the gear 24 is now carried with the drive shaft 3 and forms a driving member for the train of gears 24 to 31, the motion being transmitted through these gears as before explained. With the gears having the relative diameters above noted, the speed of the shaft 6 will now be one sixteenth that of the driving shaft. That is, the speed of the driven mechanism has been multiplied by four. When the coil 8 is deënergized, the disk D is released from the casing and connected to the disk C. The gear 28 now rotates with the driving shaft 3, and transmits its motion through the gears 29 and 30 to the gear 31, and the shaft 66 is rotated at one fourth the speed of the drive shaft. When the coil 9 is deënergized, the disk E is connected to the disk D, and all the disks, the gears 20 to 31, and the shaft 6 rotate together as a unit. The disks A, B, C, D and E being connected to the drive shaft, and having considerable weight, form an effective fly wheel for the engine K. Obviously the number of intermediate steps between the fast and slow speed may be increased or decreased by varying the number of disks employed. The extent of variation in the speed for each step may be regulated by varying the relative sizes of the gears. When the controller lever is moved back toward initial position, the magnet coils 9, 8, 7 and 6 are energized in succession to effect a decrease in the speed, and as the lever is moved off the contact strips 87 and 88, the reversing clutch members are disconnected and the brake applied to bring the driven shaft to rest. If the controller lever 82 is moved to the left from a central position, the reversing clutch magnet 47 will be energized and effect a connection of the clutch members 32 and 35 so that the shaft 57 will be driven in the reverse direction. Otherwise, the operation is the same as when the lever 82 is moved to the right. As the gears 20 and 31 are permanently connected, there is no possibility of them becoming interlocked as in the usual forms of speed changing devices, and thereby stripping the gear teeth or otherwise injuring the mechanism. A switch P, which may be termed an emergency switch, may be placed in the circuit controlling the reversing clutch magnets and the brake magnet if desired. By opening this switch, the current to magnets 46 and 47 and the brake magnet are opened independently of the controller M so that the driven shaft is disconnected from the engine and the brake at once applied. It is also sometimes desirable to control the brake circuit separately from the controller M. For this purpose, a variable resistance R is adapted to be connected in the brake circuit. An example of the use of this rheostat is found in the control of an automobile to which this invention may be applied. If the machine is going down a hill, the controller lever 82 may be moved to central position to cut off the power, and the lever 100 may then be moved into position to connect more or less of the resistance R in the brake circuit, thereby weakening the brake magnet and permitting the brakes to be applied with more or less power.

Fig. 6 shows a modification in which the clutch magnet coils are initially deënergized. The sections of the casing are separated by annular plates 101 of phosphor-bronze or other suitable non-magnetic material. The bolts 5 are also preferably surrounded by tubes of non-magnetic material. The disk A' is keyed to the drive shaft. The disks B', C', D' and E' are rotatable independently of the drive shaft, and are also adapted to have a slight movement longitudinally of the shaft. The flanged peripheries of the disks form armatures for the magnets, and are formed with inclined clutch faces 102 separated by air gaps which in practice may be very narrow. The disks are separated by coil springs 103 when the magnet coils are deënergized. Collars 104 are formed with ball races to receive bearing balls which take up the end thrust of the disks. The operation with this construction is very similar to that already described. When the controller lever 82' is moved to the right, for example, it first engages the contacts 87 and 88 to operate the reversing clutch and release the brake magnet. The lever next engages the contact 83' and closes a circuit through the magnet winding 6. The disk B' is now drawn into frictional contact with the disk A', so that the latter is rotated with the drive shaft, and transmits motion through the train of gears to the driven mechanism. As the controller lever 82 engages the contacts 84', 85', and 86', the coils 7, 8 and 9 are energized and connect the disks C', D' and E' to rotate with the drive shaft. When the clutch magnets are deënergized, the disks B', C', D' and E' are held by the springs 103 in frictional contact with the stationary rings 101.

I wish not to be limited to the particular constructions herein disclosed, as various changes in the details and arrangement of parts might be made by those skilled in the art without departing from the spirit and scope of the invention.

What I claim as new and desire to secure by Letters Patent of the United States, is:—

1. The combination of a train of intermeshing gears, rotary members carrying certain of said gears, means for operating said gears, electromagnets comprising stationary elements and movable elements carried by said rotary members, said movable elements being movable into positions to effect a connection between the rotary members and cause them to rotate together, and means for energizing the magnets and holding the said rotary members against rotation for changing the movement of certain of said gears from one of translation to one of rotation and thereby effecting a variation in the relative speed of said gears without varying their intermeshing connections.

2. The combination with a driving element and a driven element, of a train of gears forming a permanent driving connection between said members, and each rotatable about its own axis when the driving element is operated, electromagnets comprising stationary members and members connected for rotation with certain of said gears, each of said last named members being movable when its magnet is energized into frictional contact with a stationary member, and also movable when its magnet is deënergized into a position to control the relative movement of certain of said gears, and means for successively energizing said magnets.

3. The combination of a driving gear, a driven gear and an interposed disk having a common axis of rotation, a shaft journaled in said disk, gears fixed to said shaft and meshing respectively with the driving gear and the driven gear, an electro-magnetic device comprising a stationary member and a member carried by the disk, means for energizing said electro-magnetic device and thereby holding the disk from rotation with the driving gear, and means coöperating with said member for connecting the disk for rotation with the driving gear, when the electromagnet is deënergized.

4. The combination with a driving gear, of a member having the same axis of rotation as said gear, a driven gear also rotatable about said axis, intermediate gears carried by said member, and meshing respectively with said driving gear and driven gear, an electro-magnet comprising a stationary body portion and an armature carried by said member, and means coöperating with said armature for connecting said member and the driving gear for rotation as a unit.

5. The combination with a drive shaft, of disks loosely mounted thereon, gears mounted on and supported by the drive shaft between said disks, gears carried by said disks and coöperating with said first named gears, and means for successively connecting said disks for rotation with the drive shaft.

6. In power transmitting mechanism, the combination with a driving element and a driven element, of a plurality of members mounted on and supported by the driving element and rotatable about the axis of the driving element, means for holding said members against rotation, means for successively releasing said members and connecting them for rotation with the driving element, and power transmitting devices interposed between said members.

7. In power transmitting mechanism, the combination with a rotary driving element and a rotary driven element having the same axis of rotation, a series of members mounted on and supported by one of said elements and independently rotatable about said axis, gearing connecting said members and said elements, and means for successively connecting said members for rotation with the driving element as a unit.

8. The combination with a driving member and a driven member, of a train of gears forming a driving connection between said members, electromagnetic clutch mechanism comprising stationary magnets and armatures rotatable with certain of the gears, means coöperating with said armatures to control the relative movement of the gears while the magnets are deënergized, and means to effect a successive operation of said armatures to successively lock the gears in said train and thereby regulate the relative speed of said members.

9. In power transmitting mechanism, the combination with a stationary casing, of a plurality of disks rotatable within the casing, clutches carried by said disks and movable into engagement with the casing and also movable into clutching connection with adjacent disks, means for successively operating said clutches, and gearing connecting said disks.

10. The combination with a casing, of a plurality of members rotatable within the casing, clutches carried by said members and movable into frictional engagement with the casing, and also movable into position to form a clutching connection between said members, power transmitting gears coöperating with said members, and mechanism for operating the clutches.

11. The combination with a train of permanently connected gears, electroresponsive mechanism for varying the relative speed of said gears, said mechanism comprising electromagnets having armatures rotatable with certain of said gears, reversing clutch mechanism, brake mechanism, and an electrical device for controlling said mechanism.

12. The combination with a train of permanently connected intermeshing gears, of friction clutch mechanism operative to vary the relative speeds of the gears, reversing clutch mechanism, brake mechanism, electro-responsive devices for controlling and operating said mechanisms, and a manually operable device for controlling said electro-responsive devices.

13. The combination with a driving element, of a train of variable speed gearing, electro-magnetic clutch mechanism controlling said gearing, reversing clutch mechanism, brake mechanism, electro-magnets for operating said mechanisms, and means operated by the driving element for supplying electric current to operate the electro-magnets.

14. The combination with a driving member and a driven member, of permanently connected speed changing gears, friction clutch mechanism for varying the relative speeds of said gears, brake mechanism for the driven member, electro-responsive devices for operating and controlling said mechanisms, and a single manual controlling device for controlling said electro-responsive devices.

15. The combination with a train of positively connected speed changing gears, of friction clutches controlling the relative speed of said gears, reversing clutch mechanism, brake mechanism, electro-magnets for operating said mechanisms, and a controller included in the electric circuits of said electro-magnets, and operable to effect the operation of said electro-magnets in a predetermined order.

16. In combination, a driving member, a driven member, variable speed power transmitting mechanism connecting said members and comprising a plurality of intermeshed gears, disks carrying certain of said gears, electromagnetic clutches having stationary magnet coils and armatures carried by the disks, said armatures being each movable into position to hold its disk stationary and movable into another position to connect its disk with an adjacent disk, and means for successively operating the clutches and thereby varying the speed of the driven member in successive steps.

17. The combination with a casing, of variable speed and power transmission mechanism within the casing and comprising a plurality of intermeshed gears and a plurality of rotary gear carrying members, and electro-magnetic clutches for frictionally engaging said members either with the casing or with each other, and thereby varying the speed and power transmitted.

18. In variable speed and power transmission apparatus, the combination with a drive shaft, of a plurality of disks mounted thereon, and supported thereby gears carried by the disks, other gears mounted on the shaft and intermeshing with said first named gears, a driving connection between said shaft and gears, means for holding said disks against rotation, and means to successively release the disks and connect them with each other to vary the speed transmitted.

19. In variable speed and power transmission mechanism, the combination with a rotary drive shaft, of a member keyed to the shaft, a plurality of members loosely mounted on and supported by the shaft, gears carried by said last named members, gears loosely mounted on and supported by the shaft and in mesh with the first named gears, means to hold said loosely mounted members stationary and permit the drive shaft to run idle, and means to successively release said loosely mounted members from their stationary positions and connect them to said first named member for rotation with the drive shaft.

20. The combination with variable speed power transmitting mechanism, of electro-magnets controlling said mechanism, reversing clutches, electro-magnets controlling said clutches, a brake, an electro-magnet for operating the brake, a controller in the circuits of said magnets, and a safety switch controlling the circuits for the reversing clutch magnets and the brake magnet independently of said controller.

21. The combination with a driving member and a driven member, of variable speed mechanism between said members, electro-magnetic clutches controlling said mechanism, reversing clutches, electro-magnets for operating the reversing clutches, an electro-magnetic brake, a manual controller in the circuits for the electro-magnets, and a safety switch controlling the circuits for the reversing clutch magnets and the brake magnet independently of said manual controller.

22. The combination with a driving member and a driven member, of variable speed power transmitting mechanism between said members, an electro-magnetic brake, a controlling device operable to control said variable speed mechanism and brake, and manually operable means to control the brake independently of said controlling device.

23. The combination with a driving member and a driven member, of variable speed power transmitting mechanism between said members, electro-magnetic clutches controlling said mechanism, reversing clutches, electro-magnets for operating the latter, an electro-magnetic brake, a manual controller controlling the operation of said electro-magnets and clutches, and a rheostat operable to vary the resistance in the brake magnet circuit and thereby control the brake independently of said manual controller.

24. In power transmitting mechanism, the combination with a driving member and a driven member, of a train of gears between said members, clutch mechanism operable to vary the relative speed of said gears, and means driven by the driving member to generate power for operating said clutch mechanism.

25. In power transmission mechanism, the combination with a driving member and a driven member, of a train of gears forming a driving connection between said members, electro-magnetic clutches operable to vary the relative speed of the gears without disconnecting them, and an electric generator driven by the driving member and supplying current for the clutch magnets.

26. In power transmission mechanism, the combination with a driving member and a driven member, of a train of gears between said members, electro-magnets controlling the relative speed of the gears, reversing clutches, electro-magnets for operating the clutches, a brake, a brake operating electro-magnet, and a generator connected to the driving member and supplying electric current to the magnet windings of said electro-magnets.

27. The combination with a casing formed of magnetic material, of a plurality of magnet coils within the casing and adapted to successively magnetize sections of the casing, and each maintain its section of the casing magnetized during the magnetization of succeeding sections, a driving member, and power transmitting devices comprising magnetic members coöperating with the magnetic casing and operable to vary the speed transmitted from the driving member.

28. The combination with a casing comprising a plurality of annular sections formed of magnetic material, of a plurality of magnet coils within the casing and adapted to successively magnetize said sections, means for energizing said coils, rotary disks within the casing, armatures carried by said disks and movable into engagement with said sections of the casing, and power transmitting gearing connecting said disks.

In testimony whereof I have signed my name to this specification in the presence of two subscribing witnesses.

AUGUST SUNDH.

Witnesses:
 JOHN F. RULE,
 J. A. SUPLISK.